United States Patent
Lifshitz et al.

(10) Patent No.: US 10,979,483 B2
(45) Date of Patent: *Apr. 13, 2021

(54) APPLICATIONS ON TOP OF A WEB SITE

(71) Applicant: Transform SR Brands LLC, Hoffman Estates, IL (US)

(72) Inventors: Gadi Lifshitz, Kiryat Ono (IL); Ofer Egozi, Kfar Vitkin (IL); Yossi Shmueli, Herzelia (IL); Avishay Lavie, Tel Aviv (IL); Moran Benisty, Rishon Lezion (IL)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,081

(22) Filed: Jul. 23, 2019

(65) Prior Publication Data
US 2020/0021636 A1    Jan. 16, 2020

Related U.S. Application Data

(63) Continuation of application No. 14/024,318, filed on Sep. 11, 2013, now Pat. No. 10,362,085.

(60) Provisional application No. 61/700,754, filed on Sep. 13, 2012.

(51) Int. Cl.
*H04L 29/08* (2006.01)
*G06F 3/0484* (2013.01)
*H04L 12/58* (2006.01)

(52) U.S. Cl.
CPC .............. *H04L 67/02* (2013.01); *H04L 67/20* (2013.01); *H04L 67/2838* (2013.01); *H04L 51/32* (2013.01)

(58) Field of Classification Search
CPC .......... H04L 67/02; H04L 67/20; H04L 67/34
See application file for complete search history.

(56) References Cited

U.S. PATENT DOCUMENTS

| | | |
|---|---|---|
| 8,769,012 B1 | 7/2014 | Shah |
| 8,862,598 B1 | 10/2014 | Marra |
| 8,881,014 B2 | 11/2014 | Kenna |
| 9,100,171 B1 | 8/2015 | Peterson |
| 2009/0031301 A1 | 1/2009 | D'Angelo |
| 2011/0302098 A1* | 12/2011 | Yoshida .............. G06F 16/9535 705/319 |
| 2012/0209783 A1 | 8/2012 | Smith |
| 2012/0303425 A1 | 11/2012 | Katzin |
| 2012/0311639 A1 | 12/2012 | Hill |
| 2013/0066963 A1 | 3/2013 | Odio |

\* cited by examiner

*Primary Examiner* — Nhat Huy T Nguyen
(74) *Attorney, Agent, or Firm* — McAndrews, Held & Malloy, Ltd.

(57) ABSTRACT

Systems and methods are disclosed that provide an integrated user interface experience with third party applications selected by a user and accessed as part of a web site such as an e-commerce web site, for example. In some embodiments, systems and methods are disclosed that support access to additional user selected functionality on top of a web site platform. This allows third-party developers, who can be different from the web site operator and/or sponsor, to inject content and capabilities into a web site.

21 Claims, 16 Drawing Sheets

APPLICATIONS ON TOP OF A WEB SITE

CROSS-REFERENCE TO RELATED APPLICATIONS

The present application is a continuation of U.S. Pat. No. 14,024,318 filed Sep. 11, 2013, which makes reference to, claims benefit of, and claims priority to U.S. Provisional Patent Application No. 61/700,754, filed Sep. 13, 2012, the entireties of which are hereby incorporated herein by reference, in their entirety.

FIELD OF THE INVENTION

Certain embodiments of the invention relate to methods supporting access to additional user selected functionality on a web site. More specifically, certain embodiments of the present invention relate to methods and systems that provide an integrated user interface experience with third party applications selected by a user and accessed as part of a commercial web site such as an e-commerce web site.

BACKGROUND OF THE INVENTION

Web sites are assembled by creating a number of web pages containing still pictures, graphical elements, portions of text, motion video, audio materials. Executable scripts may be used both at the web client and within the web site infrastructure, to perform various functions. The functionality available to a user of a conventional web site is typically defined by the developer(s) involved in the creation of the web site, and each user simply accesses the functionality provided when a given page is delivered to the user's web client and rendered for display. The same functionality is typically available to all users of a given web page of particular web site.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that provides an integrated user interface experience with third party applications selected by a user and accessed as part of a web site, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
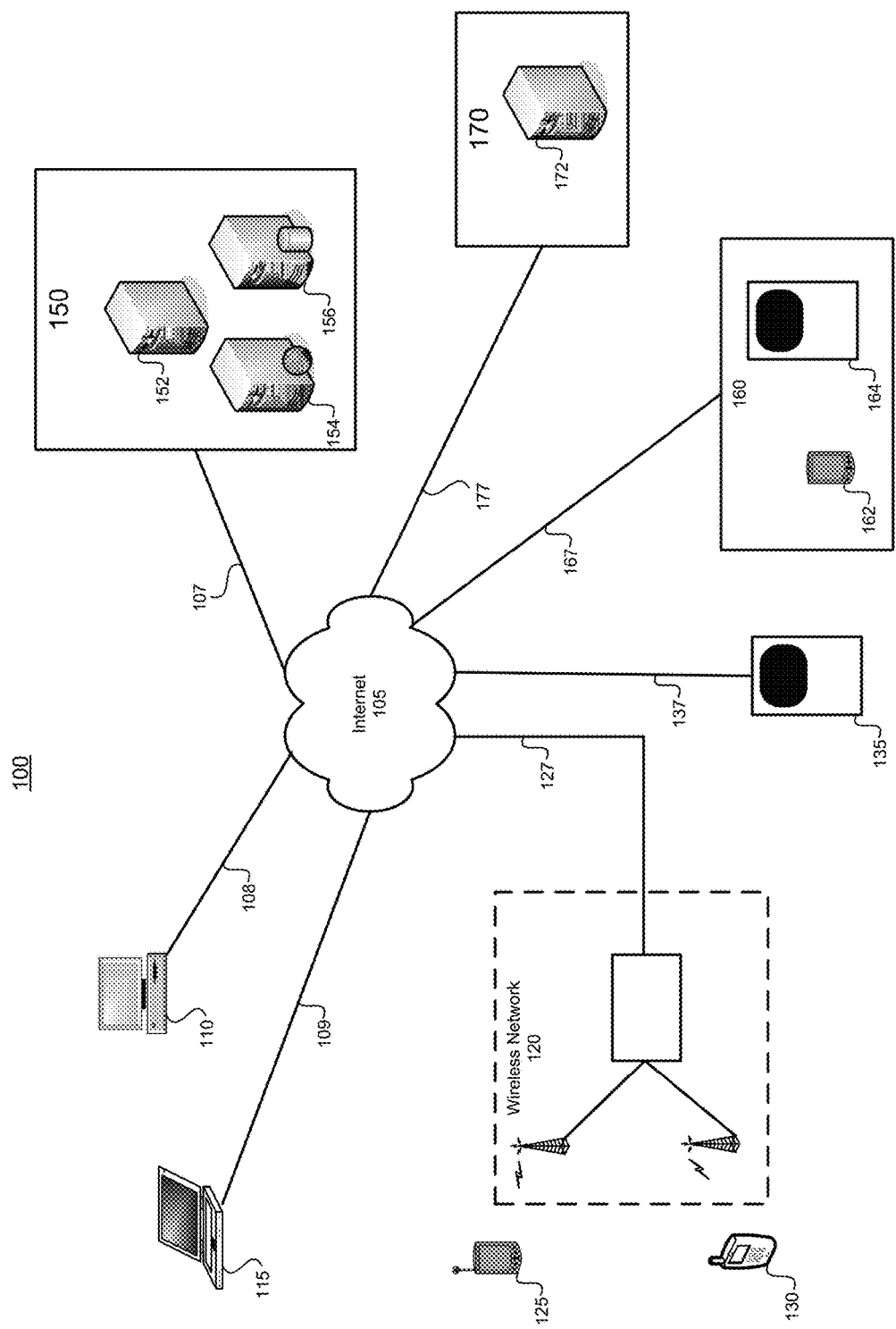
FIG. 1 is a block diagram of an exemplary system on which a representative embodiment of the present invention may be practiced.

Aspects of the invention relate to methods supporting access to additional user selected functionality on top of a web site platform. More specifically, certain aspects of the present invention relate to methods and systems that provide an integrated user interface experience with applications selected by a user and accessed as part of a web site such as, for example, an e-commerce web site.

A representative embodiment of the present invention may be used as part of any computer system that supports serving of web pages to user clients such as, for example, a web browser like Internet Explorer® from Microsoft Corporation, Google Chrome®, Safari® from Apple Inc., or Mozilla Firefox®. A representative embodiment of the present invention may be used on a single computer system or may be distributed between or among a plurality of computer systems, which may be interchangeably referred to herein as a web site, a social commerce platform, an e-commerce platform, or an e-commerce web site. Such a platform supports user social interaction and commerce via the Internet.

A representative embodiment of the present invention enables the seamless addition of user-selected applications to web pages served by a web site such as, for example, an e-commerce web site, and enables those other than the operator/sponsor of the web site (e.g., third party developers) to enrich and enhance the user experience of the web site and to provide additional services, features and capabilities that are not provided by the core web site technology. A representative embodiment of the present invention enables distributed and/or crowd-sourced development (e.g., by third-party developers) of a web site, to inject content and capabilities into the web site. For example, various embodiments of the present invention enable a third-party to add pages inside of a web site, to display user selectable/clickable "buttons," and to display banners and text in pages that, for example, show details for products. Representative embodiments of the present invention enable third-parties to provide various forms of content and user experience in web pages for, in an example of an e-commerce context, product brands, stores of various kinds, and information related to various public figures, celebrities, and other individuals or groups. A representative embodiment also enables third-parties to post messages to a user in such an e-commerce site. These capabilities enable third-parties to innovate in web sites such as, by way of example and not limitation, e-commerce sites, social networking sites, and search engine sites, and to explore and test their ideas and innovations in the environment of a real-life, working web site. In addition, a representative embodiment of the present invention enables, in the example of a e-commerce-related site, new business models for commerce, sales up-lift, and engagement. It should be noted that although the following discussion makes frequent mention of the use of representative embodiments of the present invention with regard to web sites related to activities surrounding e-commerce, the innovative concepts described herein are not necessarily specifically limited in that regard, and may be applied to web sites of all types, and used for a variety of purposes, without departing from the scope of the inventive concepts revealed here.

A representative embodiment of the present invention consists of a unique platform that enables applications to enhance the user experience of a web site such as, for example, a social or e-commerce site, enables the applications to insert various forms of content, buttons, messages, and notifications into web pages served by the web site, and may be used to produce a seamless experience for the user.

A representative embodiment of the present invention provides application developers the opportunity and tools to develop their applications on top of the platform, user application programming interfaces (APIs) to enable an application to query the platform, and user defined areas to provide its content. A representative embodiment of the present invention also enables applications to include text, "calls to action," and "buttons" within strategic areas of the web site (e.g., within an e-commerce site), such as "Product Details" pages, and areas in which the user views messages (e.g., newsfeeds or any other means of communication).

A representative embodiment of the present invention aids the business entities operating or sponsoring the web site or e-commerce platform to capture information about customer behavior in order to permit improved customization of customer experience in future use of the e-commerce platforms of the sponsoring business(es), and those of their business partners, across the various points of contact with customers.

A representative embodiment of the present invention may, for example, be used to promote member engagement with an e-commerce platform and the sponsoring business (es), by providing opportunities and incentives to create content such as, for example, pictures, catalogs, product and/or service reviews, to assist members in getting information and/or opinions of others related to their purchase decisions, to offer aid to users in their shopping activities and managing life events, and to interact with and engage their own personal social networks. In addition, a representative embodiment of the present invention promotes involvement of the personal social networks of the users, in sponsored activities available through the e-commerce platform. Such a web site platform may be referred to herein as a social commerce/e-commerce platform.

A representative embodiment of the present invention may be seen in a method of operating a web site such as, for example, an e-commerce platform that enables users to customize web pages served to the users by the platform. The users of the e-commerce platform may be, for example, customers of a business that operates or sponsors operation of the platform, and may be or become members of a loyalty program that promotes participation in various activities and events that may be hosted on the platform. Some users of the e-commerce platform may be referred to herein as customer members.

A representative embodiment of the present invention permits a user of a web site to customize particular pages of the web site to include functionality specifically selected by the user. Such included functionality may, for example, enable a user to perform user-selected actions that the user wishes to have available on a specific web page, or on one or more other web pages chosen by the user. Each user may customize the functionality included on the various web pages that they access, and the functionality included on a particular web page accessed by a particular user may be the same or different than that included on the same web page when access by a different user. The user-selected functionality available on any web page, which may be referred to herein as user-selected "applications," may be different for each user accessing each page of a web site. In a representative embodiment of the present invention, additional functionality desired by the sponsor and/or operator of the platform serving web pages to users may be added using the same mechanism employed for user-selected applications. In either case, it should be noted that the additional functionality of the applications may be provided by a separate platform that may be operated by a third party, and use of the application may involve little or no additional work to be performed by the web site platform.

The term "social network" may be used herein to refer to a network of family, friends, colleagues, and other personal contacts, or to an online community of such individuals who use a website or other technologies to communicate with each other, share information, resources, etc.

The terms "customer" and "consumer" may be used herein interchangeably to refer to a potential or existing purchaser of products and/or services of a business. The terms "customer," "consumer," and "user" are understood herein to refer to those that may act as an "end-user" of a web site or mobile application, in contrast to those that may be considered to be developers, administrators, operators, and/or sponsors of a web site or mobile application that an "end-user" may employ in order to engage in various activities including, by way of example and not limitation, e-commerce and social networking.

As utilized herein, the terms "exemplary" or "example" means serving as a non-limiting example, instance, or illustration. As utilized herein, the term "e.g." introduces a list of one or more non-limiting examples, instances, or illustrations.

The following discussion of various aspects of representative embodiments of the present invention uses an example of the application of those inventive aspects in terms of features of an e-commerce web site. It should be noted that this is for the purpose of illustration to aid understanding, and that the examples do not necessarily represent specific limitations of the present invention, unless recited by the claims.

FIG. 1 is a block diagram of an exemplary system 100 on which a representative embodiment of the present invention may be practiced. As illustrated in FIG. 1, the system 100 includes an e-commerce platform 150 comprising one or more web servers 154, one or more database servers 156, and one or more application servers 152. The elements of the e-commerce platform 150 may be interconnected, and may singly or as a group be connected to Internet 105 via communication link 107, which may employ any suitable combination of wired or wireless data communication links. FIG. 1 also includes personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, or any other electronic device having capabilities suitable for accessing the Internet 105 from, for example, a home, a small business, or any private or public area having suitable support for communications links 108, 109.

In addition, FIG. 1 illustrates a user communication device 125 that may comprise, for example, a tablet computer, smart phone, or other handheld electronic device capable of communicating with the e-commerce platform 150 via a wireless network 120, a communication link 127, and the Internet 105. The communication device 125 of FIG. 1 may include suitable software applications, hardware, and logic to permit the communication device 125 to display received web pages and other forms of digital information on a display of the communication device 125, and suitable user interface (UI) elements to permit a user to interact with the e-commerce platform 150 using tactual, speech, and other forms of input. The wireless network 120 may support communication of digital information using any suitable wireless access technology including, for example, any combination of short-range, long range, Wi-Fi, cellular, personal communication system (PCS), Bluetooth, Near Field communication (NFC), to name only a few possible air interface technologies.

FIG. 1 also includes a portable telephone 130 that may be capable of communicating over one or more of a cellular, PCS, Wi-Fi, or other wireless communication network, and may have more limited yet sufficient functionality to interact with the e-commerce platform 150 than that available from the PCs 110, 115 and the communication device 125.

In addition, FIG. 1 illustrates a kiosk device 135, which may permit users in retail and public venues to access the e-commerce platform 150. The kiosk device 135 may be designed for indoor or outdoor use, and may be linked to the e-commerce platform 150 via a communication link 137 and Internet 105, as shown, or may communicate directly with the e-commerce platform 150 using any other suitable wired or wireless means. The kiosk 135 may have functionality that is equivalent, greater than, or less than the personal computers 110, 115, the communications device 125, and the cellular telephone 130.

The illustration of FIG. 1 also shows a retail establishment 160 that may, for example, be a "brick-and-mortar" business associated with the operator or sponsor of the e-commerce platform 150. The retail establishment 160 may include a kiosk 164 that may support access to the e-commerce platform 150 from the retail establishment 160, for those users that are located within the retail establishment 160. The illustration of FIG. 1 also includes a communication device 162 that may belong to, or be loaned to a customer of the retail establishment 160, permitting the customer to, for example, electronically access information about products and/or services available at the retail establishment 160, at other business locations of the operator of the retail establishment 160, or at other businesses operated by, for example, the operator, or businesses that partner with the operator of the e-commerce platform 150. Communication devices within the retail business 160 such as, for example, the communication device 162 and the kiosk 164 may communicate with the e-commerce platform 150 via the Internet 105 and the communication link 167, which may be, for example, any suitable combination of wired and/or wireless communication technologies. Of course, the communication device 125 and cellular phone 130 may also be used in the retail establishment 160, and may directly interact with systems of the retail establishment 160 without using the communication infrastructure of a wireless common carrier such as a cellular service provider.

In addition, the system 100 of FIG. 1 includes an application/web server 170 that may, for example, be operated by a third-party provider of applications selectable by users of the e-commerce platform 150, and that may be arranged to interact with elements of the e-commerce platform 150, as described more fully below. In a representative embodiment of the present invention, a computer system such as the application/web server 170 may perform most or all of the actions needed to provide the functionality of the applications selected by the end-user and those added to web pages by the operator and/or sponsor of a web platform such as the e-commerce platform 150. The use of such applications may result in little or no additional work by the e-commerce platform 150.

In accordance with a representative embodiment of the present invention, the elements of a system such as the e-commerce platform 150 of FIG. 1 may include the functionality in a software application that enables user membership in a loyalty program of a business operator or sponsor of the e-commerce platform 150, and the engagement of users in various events and the activities. The e-commerce platform 150 may include a software platform which tracks social interactions of users, and may track the activities of each member of the loyalty program. The tracking capabilities may include a flexible interaction tracking framework that supports multiple social interactions of the members. In addition, the software application may support interfacing a variety of user communication devices including, for example, tablet, desktop, notebook, notepad, and network computers, cellular telephone and smart phones, public and private kiosks, and other suitable electronic user communication devices available at the present time or in the future.

The e-commerce platform 150 may also include suitable software, hardware, and/or suitable logic of an application that provides functionality supporting registration of user-selectable applications by a computer system such as the application/web server 170 with a system such as, for example, the e-commerce platform 150, and user selection of one or more such registered applications to be associated with the user and made accessible on web pages served by the e-commerce platform 150 to the user. Such applications running on the application/web server 170 may, for example, interact with, access, and/or modify information such as, for example, information about user(s) of the e-commerce platform 150 that may be present on the e-commerce platform 150. For example, in a representative embodiment of the present invention, a user-selected application made available on web pages served to users of a computer system such as the e-commerce platform 150 may, when accessed by a user, activate application functionality on a third party system such as the application/web server 170. The third party system may then communicate with the e-commerce platform 150 to access various information including, by way of example and not limitation, information about that and/or other users, or other information accessible via the e-commerce platform 150.

Figure 2A:
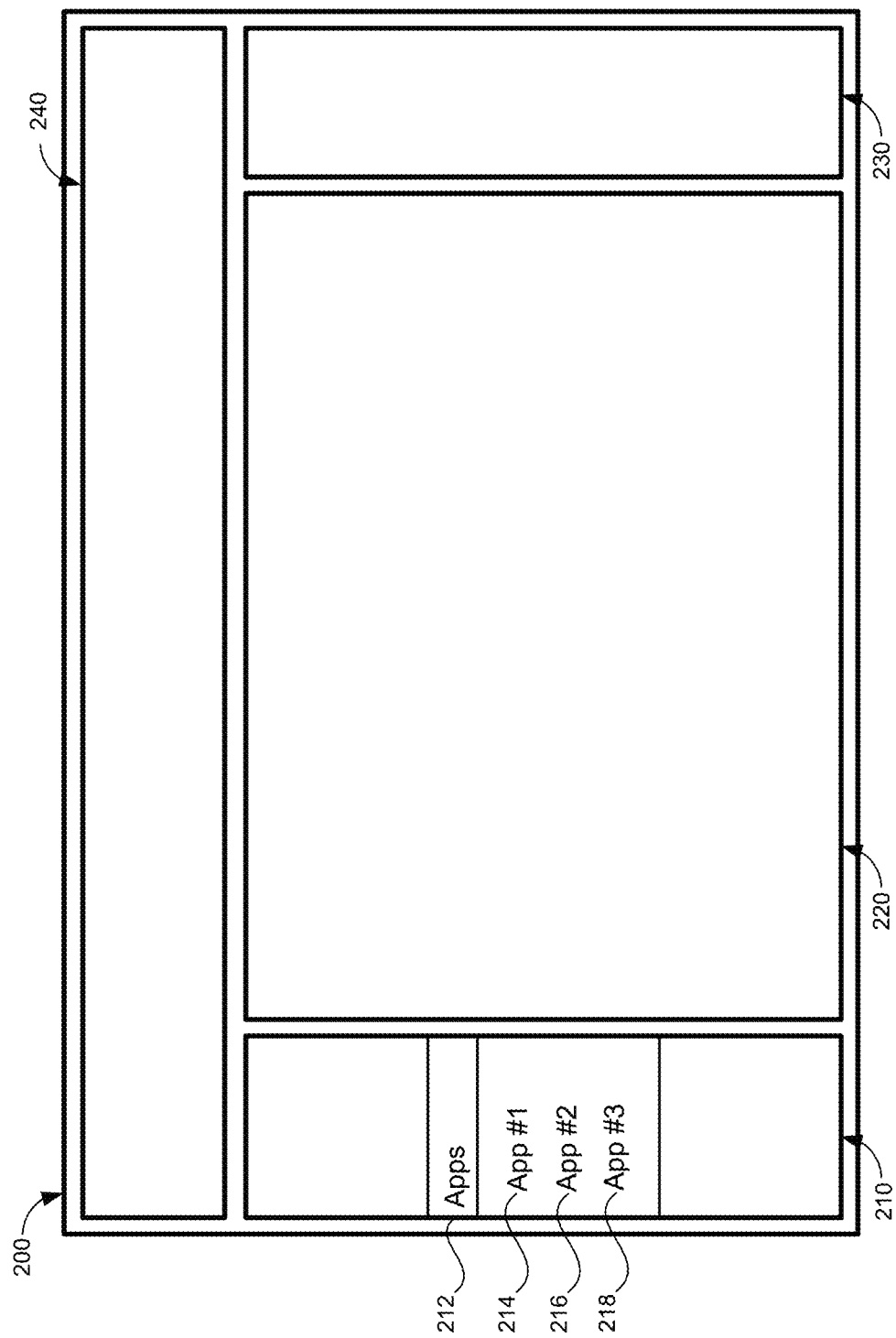
FIG. 2A is an illustration of various portions of an exemplary web page within which information may be displayed on the screen of a user device, in accordance with a representative embodiment of the present invention.

FIG. 2A is an illustration of various portions of an exemplary web page 200 within which information may be displayed on the screen of a user device, in accordance with a representative embodiment of the present invention. A representative embodiment of the present invention enables a user of a web site such as that supported by, for example, the e-commerce platform 150 of FIG. 1 to select one or more applications for inclusion on web pages served to the user by the web site. Each of the web pages served to the user by the e-commerce platform 150 may be divided into a number of geometric regions, which may be referred to herein as "portions" or "panes." Some "panes" such as, for example, parts of portions 210, 220, 230, 240 of FIG. 2 may be under the control of registered applications to permit the application to interact with a user of the web site supported by the e-commerce platform 150. The portions 210, 220, 230, 240 of the web page 200 of FIG. 2 may be referred to herein as a "left navigation" or "left nav" portion 210, a "canvas" portion 220, a "right portion" 230, and a "header" portion 240, respectively. The applications available for user selection, represented by and accessible via application links 214, 216, 218 of "left nav" portion 210, may be prepared by third-party developers in cooperation with the operator/sponsor of the e-commerce platform 150, and portions of the functionality of the applications may be implemented on a system such as, for example, the application/web server 170 of FIG. 1, which may be communicatively linked to the e-commerce platform 150 via the Internet 105 or, for example, a dedicated communication path (not shown). Following development, such applications may, for example, be made available by the application developer to users of the e-commerce platform 150 for installation on web pages such as web page 200 of FIG. 2 that the users access, through a process that may be referred to herein as "registration."

Figure 2B:
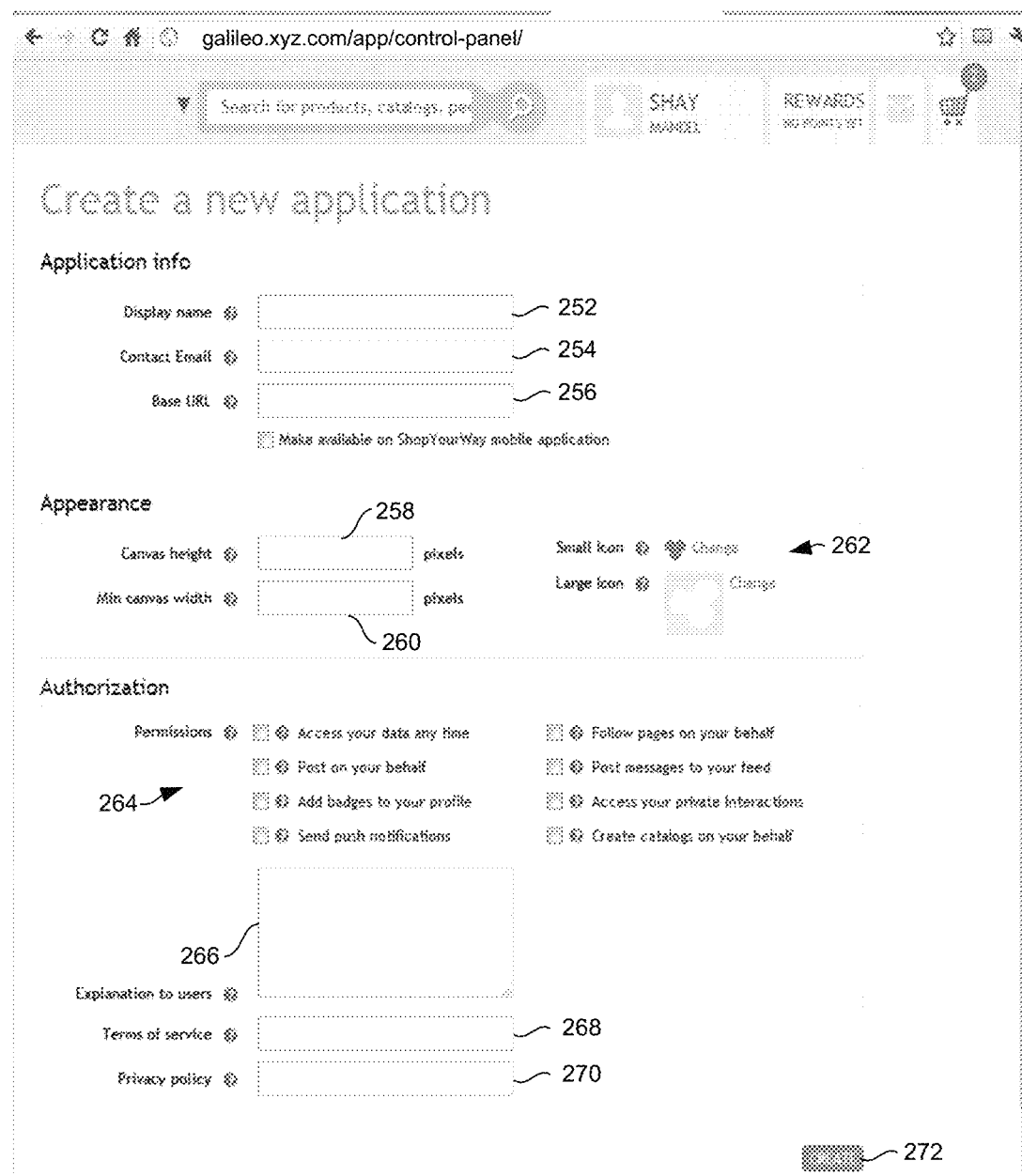
FIG. 2B is an illustration of an exemplary application registration screen, in accordance with a representative embodiment of the present invention.

The registration of an application with a system such as the e-commerce platform 150 may, for example, be made by a member of the organization that developed the application, and may be a one-time occurrence for each web site on which the application is to be made available. An example of a web-based form for registration of a user selectable application is shown in FIG. 2B, discussed in further detail, below. As illustrated in FIG. 2B, the registration of the application with the e-commerce platform 150 may involve the submission to the e-commerce platform 150 of a number of parameters including, for example, a name and/or a "display name" for the application 252, an icon or graphical image for the application 262, and a description of the application 266. Registration may also involve submission of information about the organization/company wishing to register the application, which may include, among other things, details about the registering organization, information (e.g., an email address) of a contact person at the registering organization that will be responsible for the application 254, and a "base universal resource locator (base URL)" 256 that identifies the server from which the application serves its web pages, which may be a system such as, for example, the application/web server 170 of FIG. 1.

In a representative embodiment of the present invention, additional information that may be submitted as part of registration of an application may include, for example, attributes for what may be referred to herein as a "canvas page." The term "canvas" may be used herein to refer to a hypertext markup language (HTML) "IFrame" with content that is hosted by an application, and hence is within the full control of the application. A exemplary "canvas" may be found in FIG. 2A as "canvas" portion 220. A "canvas page" may be used by the application to display most of the custom UI elements employed by the application to interact with the user. Registration of an application may also include supplying information about attributes such as, for example, a caption such as "display name" 252 of FIG. 2B for a UI element to be shown in a region of the web page that may be referred to herein as a "left pane" or "left nav" portion (e.g., "left nav" portion 210). The attributes submitted at registration of an application may also include a target or "base URL" 256 of FIG. 2B, and size information for the IFrame that will be used to display the canvas page discussed above such as, for example, the "canvas height" 258 and "min. canvas width" 260 shown in FIG. 2B. In some representative embodiments of the present invention, the canvas page for an application may appear in what may be referred to herein as the "middle pane" or "canvas portion" of a web page, such as the "canvas" portion 220, when the UI element for the corresponding application (e.g., the link or icon shown in the "left nav" portion of the web page) is selected/clicked by the user. It should be noted that the portion of a web page used for a "canvas" does not necessarily represent a specific limitation of the present invention, as another portion or region of a web page, or multiple portions of one or more web page may be used by user-selected applications in a representative embodiment of the present invention.

The "left nav" portion of a web page (e.g., "left nav" portion 210 of FIG. 2A) may be a designated geometric region of the web page that is used, among other things, to display UI elements such as, for example, icons/graphical navigation links that represent installed applications, such as the application links 214, 216, 218 of "left nav" portion 210.

Each of the UI navigational links for the installed applications may have a caption, which may be static, and may be set when the corresponding application is registered with, for example, the e-commerce platform 150. At the time of installation of the application on the e-commerce platform 150, the application may add a "quick navigation" link to the "left nav" portion of the web page. The "quick navigation" link may point to a "main canvas page" for the installed application. In a representative embodiment of the present invention, the order in which UI elements are displayed within the "left nav" portion 210 may be automatically determined by a system such as the e-commerce platform 150 based on, for example, the order in which they were selected by the user, the usage patterns of the user, or alphabetical order.

When a canvas page (e.g., "canvas" portion 220) is loaded or refreshed in a representative embodiment of the present invention, a call may be made to the "base URL" (e.g., "base URL" 256 of FIG. 2B) that was identified during application registration. A parameter value that identifies the user (e.g., a user ID) may be appended to the base URL, as context for "canvas code" that runs on the system of the developer of the application (e.g., the application/web server 170 of FIG. 1). Any content returned from the call to the server at the "base URL" 256 of FIG. 2B may then be presented to the user within an HTML IFrame embedded in the main content section or "main pane" of the web page, also referred to herein as the "canvas" portion 220 of FIG. 2. The call to the "base URL" 256 may not return a response to redirect, but instead may return the actual content to be displayed within the IFrame displayed in the "canvas" portion 220. Any ensuing interaction of the user with the canvas page may take place only within the "canvas" portion 220, and may not interact with the surrounding portions of the web page (e.g., web page 200 of FIG. 2A. Any state or context information that may be needed at a later time related to the activities of the user may be saved on the system of the developer of the application (e.g., the application/web server 170) accessed by the user.

Upon successfully registering an application, the responsible organization may be given an "application identifier (ID)" and other information used to uniquely and securely identify and authenticate the application in interactions with a system such as, for example, the e-commerce system 150. Such information may include, for example, an "application secret key." Additional details concerning these elements are presented below.

The computer (e.g., a server) residing at the "base URL" may have a number of web pages that act as different "integration points" with the system that supports the web site on which the application is to be available such as, for example, the e-commerce platform 150. For example, the "base URL" of the application/web server 170 may be "http://myapp.com," and at least one web page may exist at "http://myapp.com/landing" that is shown as a "landing page" for the application. The term "landing page" may be used herein to refer to the first web page served when accessing a given URL.

Following registration of the application with the web site on which the application is to be made available, (e.g., the e-commerce platform 150), the user-selectable application may be made known to current/potential users. This may involve adding a link for the application to one or more web pages including, for example, the web pages of an "app store" that may appear on the web site supported by, for example, the e-commerce platform 150. The availability of the user-selectable application may also be made known through links identified in conventional advertisements in printed media, and through the use of targeted electronic communication such as, for example, email or a text messages containing a link to the landing page of the base URL for the application.

A user interested in the application may select/click on a published link for the application, which may then take the user to the landing page for the application. In a representative embodiment of the present invention, the landing page may be what is referred to herein as a "glass-wall page," which may permit a user to view the contents of the landing page without being "logged in." The user may not, however, be able to access objects on the landing page, if login is required. In a representative embodiment of the present invention, a portion of the landing page for the application may be served from a web site supported by a system such as the e-commerce platform 150, while other portion(s) of the landing page may be served and under the full control of a system of the organization responsible for development/ support of the application such as, for example, the operator/sponsor of the application/web server 170 of FIG. 1.

If the application selected for installation by the user requires login as may be the case of those applications for which additional information about the user may be desired by, for example, the application developer, and the user is not already logged in to the e-commerce platform 150, the user may be directed to a "login page" through which the user may login using, for example, a user identifier and a password. If, however, the user is unable to log in because the user is not already signed up with the operator or sponsor of the e-commerce platform 150, the user may be presented with a form to permit the user to "join" or "sign up" to be a member (e.g., of a "loyalty program"). Sign-up of the user may include displaying an "approval screen" for the application to the user. The "approval screen may list basic information about the application, and may request the user to indicate agreement with certain "Terms and Conditions," to review a "Privacy Policy" for the application, and to approve installation of the application on their behalf on the e-commerce system 150. Information identifying the application being installed, user responses to questions, and user agreement with various conditions, may be recorded in a "user profile." The information gathered may be authenticated and/or stored by a system such as the e-commerce platform 150 of FIG. 1 for example. After successfully completing the login process, or if login is not required, the user may then be taken to the web pages for the application selected by the user.

At this point, the application selected by the user may be referred to herein as having been "installed" for the user on the web site supported by the e-commerce platform 150. In a representative embodiment of the present invention, the process of "installation" of an application may include a system such as, for example, the e-commerce platform 150 storing information about the request to install the selected application by the user. The installation of the application may also involve storing a record of details about the user that installed the application on the system supporting the selected application such as, for example, the application/ web server 170. Such details may be accessed from the e-commerce platform 150 by the application/web server 170 using elements of an API provided by the e-commerce platform 150.

Once the application selected by the user has been successfully installed, the information representing future web pages served to the user by the e-commerce platform 150 may be modified to include graphical user interface elements, links, or icons representing those applications that have been installed for that user. In some representative embodiments of the present invention, executable code such as, for example, JavaScript® code, may also be added to or inserted within the digital representation of the web page served to the user client (e.g., browser). Information about the applications currently installed for each user may be stored and maintained in memory of a system that serves web pages to the user such as, for example, in a database of the e-commerce platform 150 of FIG. 1. Later, as each web page is served to the user, the stored information may be accessed and a determination may be made as to whether any applications are presently installed for the user to which the web page is being served. For example, in one representative embodiment of the present invention, a portion of a web page for a product may have or be modified to have an area of the web page where one or more links or icons may appear that represent applications currently installed for the user to whom the pages are being served, thus enabling user access to the installed applications. In some representative embodiments of the present invention, the area used to display links to installed applications may at times be collapsed, and may be opened or expanded by the user by hovering a pointing device (e.g., a mouse) over a portion of the web page such as, for example, the "Apps" caption 212 of FIG. 2A. In some representative embodiments of the present invention, an application may request that the system serving the web pages (e.g., the e-commerce system 150) cause a link to the application to appear on the landing page of every user, even if the application was not installed by the user. In such an embodiment, the link to the application may be shown on web pages only until the user closes the user client (e.g., the browser) used to display the web pages.

In a representative embodiment of the present invention, a system such as the application/web server 170 may register with the e-commerce platform 150, a particular UI element to be used to represent a corresponding installed application. The UI element may include, for example, an image, a link, an icon, or a "button" to be displayed on designated web pages served to the user. Once displayed on a web page, the UI element may be selected/clicked by the user to cause the actions of the corresponding installed application to be performed. The registration with the e-commerce platform 150 may be a "one-time" operation performed by the application/web server 170 during the installation of the application. The registration of the UI element for an application may be performed using what may be referred to herein as a "backend API" of the e-commerce platform 150. One example of a UI element that may be made to appear on a particular web page may be referred to herein as an "action button." In accordance with a representative embodiment of the present invention, an "action button" is a UI element in which user selection of the "action button" causes activation of the associated user-selected application.

Control over what UI elements (e.g., action buttons) are to be displayed on a given web page may be accomplished through the use of one or more "filters." The term "filter" may be used herein to refer to a mechanism that matches one or more "filter" values for an application or UI element used to represent an application, against metadata (e.g., "tags") for each web page served to a user. The term "tag" may be used herein to refer to a non-hierarchical keyword or term assigned to a piece of information such as a digital image, web page, or a computer file. A tag may also be used to search for items having similar tags, and therefore likely to be related.

During serving of web pages, a match of a filter value for an "action button" with, for example, a tag for a web page, may be used to identify the web page as one on which the "action button" associated with an application should be displayed. In one representative embodiment of the present invention, the web page being served may be, for example, a page that displays information about a particular product, referred to herein as a "product page", and an appropriate "action button" may be made to display on the product page to enable a user to select/click the "action button" to activate/invoke an associated application that performs a particular set of actions such, as for example, adding the displayed product to a "gift registry" for the user. In this manner, the use of one or more filters in accordance with a representative embodiment of the present invention enables the selective display of "action buttons" for an application, only for a specific set of web pages tagged for things such as, for example, products.

For example, in one representative embodiment of the present invention related to e-commerce, the UI element may represent what may be referred to herein as a "product action button," which may be shown on selected product pages used to display information about available products to users of a web site such as, for example, a web site supported by the e-commerce platform 150. Information about a particular "product action button" may be conveyed to and stored on the e-commerce platform 150 when the application represented by the "product action button" is registered with the e-commerce platform 150 by the application/web server 170. In addition, the application/web server 170 may receive and/or access information in databases on or accessible through the e-commerce platform 150. Such information may include, by way of example and not limitation, information identifying subject matter of the web page on which the "product action button" appears, information about products and other entities, and information about the user that selected the "product action button" on the web page served by the e-commerce platform 150. For example, information about a user may include information about interests of the user, and information about a product may include tags used with respect to the product. A communication interface between the application/web server 170 and the e-commerce platform 150 such as, for example, an application program interface (API) may provide the application(s) running on the application/web server 170 with deep knowledge about the data of a computer system such as the e-commerce platform 150. Information about the "product action button" may include, for example, text (e.g., a caption) that is to appear on the "product action button", any filters that are to be applied to determine the served product pages on which the product action button is to appear, and data representing an image of the product action button as it is to be shown on the served web pages. In a manner similar to that previously described above, the e-commerce platform 150 may, for example, use information that it previously stored about applications presently installed for the current user, information about the user (e.g. user interests), information about a product (e.g., tags for the product), and any filters that were identified during registration of the "product action button", to determine what, if any, of the registered UI elements should be shown on each web page, while the web page is being served to the user.

Some representative embodiments of the present invention may involve applications that specialize in conducting surveys to aid in enhancing brand experience. For example, after installing such an application, the user may go to a web page related to a particular product brand, and may be presented with application specific content related to the particular product brand. Such an application may include one or more web pages that include a brand satisfaction survey provided by an application that specializes in conducting such surveys.

Other representative embodiments of the present invention may include applications that interact with a user and then publish information (e.g., a story) to, for example, the user's "Wall" or "Timeline" of a social interaction web site. Friends, and/or followers of the user may see the information published by the application, and may select/click a corresponding link that appears with the published information. The friends and/or followers may then view a web page presented by the application to explain benefits of the use of the application, and offer an opportunity for the friends, and/or followers to install the application themselves.

In a representative embodiment of the present invention, a system such as the e-commerce platform 150 of FIG. 1 may enable user access to one or more user-selected applications, by arranging for the appearance of one or more graphical elements on a web page to be delivered to the user client. In one representative embodiment of the present invention, a portion of each web page may be reserved for the display of graphical elements corresponding to each of one or more user-selected applications.

When a user views a web page on which a selectable/clickable UI element (e.g., "action button") for an application is displayed, the user may choose to select/click the UI element to perform the actions associated with the corresponding application. In accordance with a representative embodiment of the present invention, selecting/clicking the UI element (e.g., action button) for an application may initiate the execution of, for example, JavaScript® code that may, among other things, open a dialog box containing an HTML IFrame on the screen displaying the web page. The display of the IFrame causes a call to be made to the web server of the application corresponding to the UI element (e.g., action button) selected/clicked by the user. The IFrame may then be under the full control of the application corresponding to the UI element (e.g., action button) selected by the user. As previously discussed, the web server for the application is identified by the "base URL" submitted when the application was registered by the application developer (e.g., the "base URL" 256 of FIG. 2B for the application/web server 170) with the system that serves the web page containing the UI element (e.g., the "action button"), in this example, the e-commerce platform 150.

In a representative embodiment of the present invention, the system serving web pages to users, such as for example, the e-commerce platform 150 of FIG. 1 allows the system operated by the application developer (e.g., the application/web server 170) to communicate directly with the users of an application, even when they are not actively using a "canvas" portion of a web page. This is supported by a representative embodiment of the present invention by providing support in an API of the e-commerce platform 150 to permit publishing to the "newsfeed" of a user supported by the e-commerce platform 150. Again, it should be noted that the present example related to e-commerce is for illustrative purposes only, and various embodiments of the present invention may apply to other web-based systems such as, by way of example and not limitation, social networking sites, e-commerce sites, search engine sites, genealogy sites, to name but a few. A representative embodiment of the present invention enables social interaction between users through a vehicle that may be referred to herein as a "newsfeed." The "newsfeed" for a user is an area of a web page for the user that permits other users to add information that may be private, for only the owner of the web page to view, or public, for viewing by all users having permission to view the web page. The newsfeed may act as a central component in the social and/or e-commerce experience of users, and users may receive in their newsfeed, system offers and recommendations, as well as social activities and information from people they follow.

In order to support the ability of applications to modify the experience of users interfacing with a web site, such as that supported by the e-commerce platform 150, the API provided by a representative embodiment of the present invention such as, for example, the e-commerce platform 150 provides for the application developer to communicate personalized messages to users. Such messages may be private, and may, for example, include targeted offers or personalized recommendations tailored to specific users. Such offers may be displayed as private stories on the user's newsfeed, which only the user can view. Then, if the user chooses to, the user may actively share such private stories with their friends and followers.

In a representative embodiment of the present invention, the tools of API of a system such as the e-commerce platform 150 enable an application on the system of the application developer (e.g., the application/web server 170) to publish a story to a newsfeed of a user by sending to the e-commerce platform 150 the "application secret key," which was provided to the developer system at the time of registration of the application. In a representative embodiment of the present invention, the user may be required to have the application installed at the time of API call to publish the story. The API call from the application on the application/web server 170 to the e-commerce platform 150 may, for example, provide the application secret key, the "User ID" for the user to whom the message is to be delivered, and specific message fields. The message may then be rendered on the newsfeed of the identified user as, for example, a "system story," which may be indicated in the newsfeed by the presence of an icon associated with the application, and the name of the application sending the message, as the "story name." Stories published to the newsfeed of a user in this manner may be acted upon by the user like any other story, that is, they may be shared, they may be hidden, and/or they may allow the viewer to "see more . . . ," for example.

In addition to the publication of private stories as described above, a representative embodiment of the present invention may enable applications to post a public story on behalf of a user, if the application has been granted appropriate permission(s). The publication of public stories may include instances where users choose to share their activities with their followers, or share achievements the user makes with regard to the application. In a representative embodiment of the present invention, such public stories may be published in a manner similar to status updates by the user.

FIG. 2B is an illustration of an exemplary application registration screen 250, in accordance with a representative embodiment of the present invention. As discussed above, such a user interface screen may be provided by the e-commerce platform 150 of FIG. 1, to permit the developer of an application to register the application with the e-commerce platform 150. As illustrated in FIG. 2B, the registration of the application with the e-commerce platform 150 may involve the submission to the e-commerce platform 150 of a number of parameters including, for example, a display name 252 for the application, an icon or graphical image 262 for the application, and a description 266 of the application.

Registration may also involve information about the organization/company wishing to register the application, which may include, among other things, details about the registering organization, information (e.g., an email address) for a contact 254 responsible for the application, and a base universal resource locator (base URL) 256. The base URL may be used to identify the server from which the application serves its web pages, which may be a system such as, for example, the application/web server 170 of FIG. 1.

In a representative embodiment of the present invention, additional information that may be submitted as part of registration of an application may include, for example, attributes for what may be referred to herein as a "canvas page," such as the canvas height 258 and minimum canvas width 260. As mentioned above, a canvas page may be used by the application to display most of the custom UI elements employed by the application to interact with the user. Registration of an application may also include supplying information about attributes such as, for example, a caption for the UI element to be shown in the region of the web page that may be referred to herein as a "left pane" or "left nav" portion. The attributes submitted at registration of an application may also include a target URL, and size information for an IFrame that will be used to display the canvas page, discussed above.

Registration of an application in accordance with a representative embodiment of the present invention may also include the specification of a number of permissions 264 required by the application, and may involve entry of a textual description 266 explaining to the user the purpose of the application. In addition, the registration may permit the entry of "terms of service" information 268, and "privacy policy" information 270, that may be presented to the user and to which agreement may be required, before installation of the application is allowed to proceed. Once all information for the application has been entered on the application registration screen 250, the information can be submitted and the application registered with the e-commerce platform 150, by selecting/clicking the "create" button 272.

Figure 3:
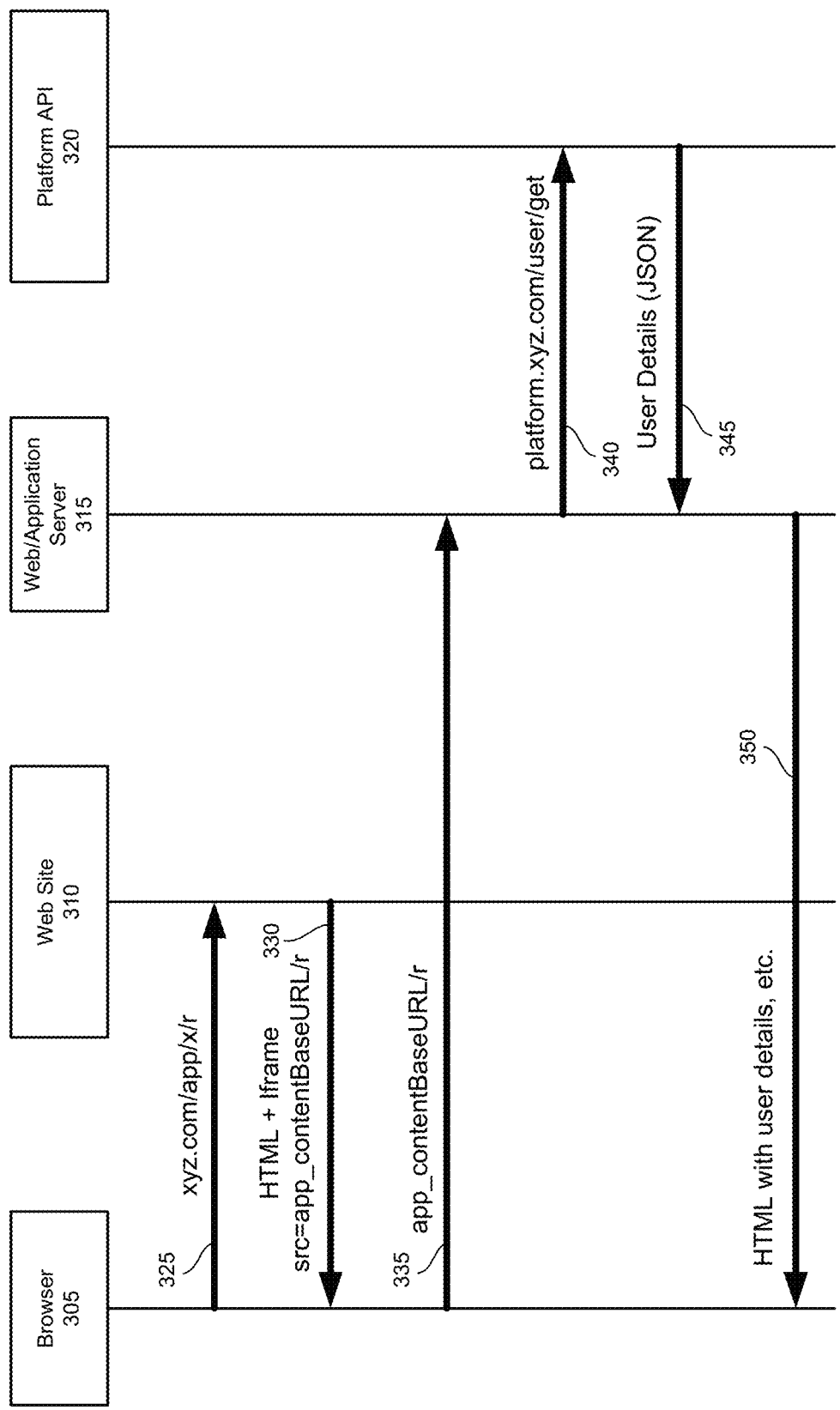
FIG. 3 is a messaging diagram illustrating an exemplary sequence of messages during user access to an application using the system of FIG. 1, in accordance with a representative embodiment of the present invention.

FIG. 3 is a messaging diagram illustrating an exemplary sequence of messages during user access to an application using the system 100 of FIG. 1, in accordance with a representative embodiment of the present invention. The illustration of FIG. 3 shows a user client or browser 305, a web site 310, an application/web server 315, and a platform API 320. The user client/browser 305 may, for example, correspond to client software running on any of the PCs 110, 115, the user communication device 125, the portable telephone 130, the communication device 162, or the kiosks 135, 164 of FIG. 1.

The web site 310 may correspond to, for example, a system serving web pages to users of an e-commerce platform such as, for example, the web server 154 of the e-commerce platform 150 of FIG. 1. The application/web server 315 of FIG. 3 may correspond to, for example, the application/web server 170 of FIG. 1, and the platform API 320 of FIG. 3 may, for example, correspond to the API described above with respect to FIG. 1 regarding the use of an API by the application/web server 170 in interfacing with the web site supported by the e-commerce platform 150.

The application-related messaging of FIG. 3 begins when a user of a user client (e.g., a browser) selects/clicks a UI element (e.g., such as one of the application links 214, 216, 218 of FIG. 2A) that appears on a web page displayed by their browser 305, in which the UI element represents an application that the user had previously installed according to a representative embodiment of the present invention. The selection of the UI element by the user causes message 325 to be sent by the browser 305 to web site 310. In response to receiving the message 325, the web site 310 may, for example, transmit HTML encoded information representing an HTML IFrame and information identifying the server on which the selected application is located (i.e., at the "base URL" of application/web server 315, as discussed above). When the browser 305 interprets the HTML sent by the web site 310 and opens the included IFrame, the browser 305 then sends a message to the application/web server 315 to identify the user to the application/web server 315, and to cause the application/web server 315 to take control of presentation of information for the user within the IFrame that was just opened on the screen displayed by the browser 305. The application/web server 315 then retrieves information about the identified user from the e-commerce platform (e.g., e-commerce platform 150 of FIG. 1) via a call using the platform API 320 via message 340.

Continuing with the example of FIG. 3, the e-commerce platform then responds to the API call from the application/web server 315 with details about the identified user. The details about the identified user are returned via the platform API 320 in message 345. In some representative embodiments of the present invention, the details about the user may be represented using JavaScript Object Notation (JSON). The application/web server 315 may then respond to the receipt of the information in message 345 by sending message 350 to the browser 305, to populate the IFrame for the selected application, with information relevant to the identified user. In a representative embodiment of the present invention, the selected application on the application/web server (e.g., the application/web server 170) may then have full control over the IFrame displayed by the browser 305.

Figure 4:
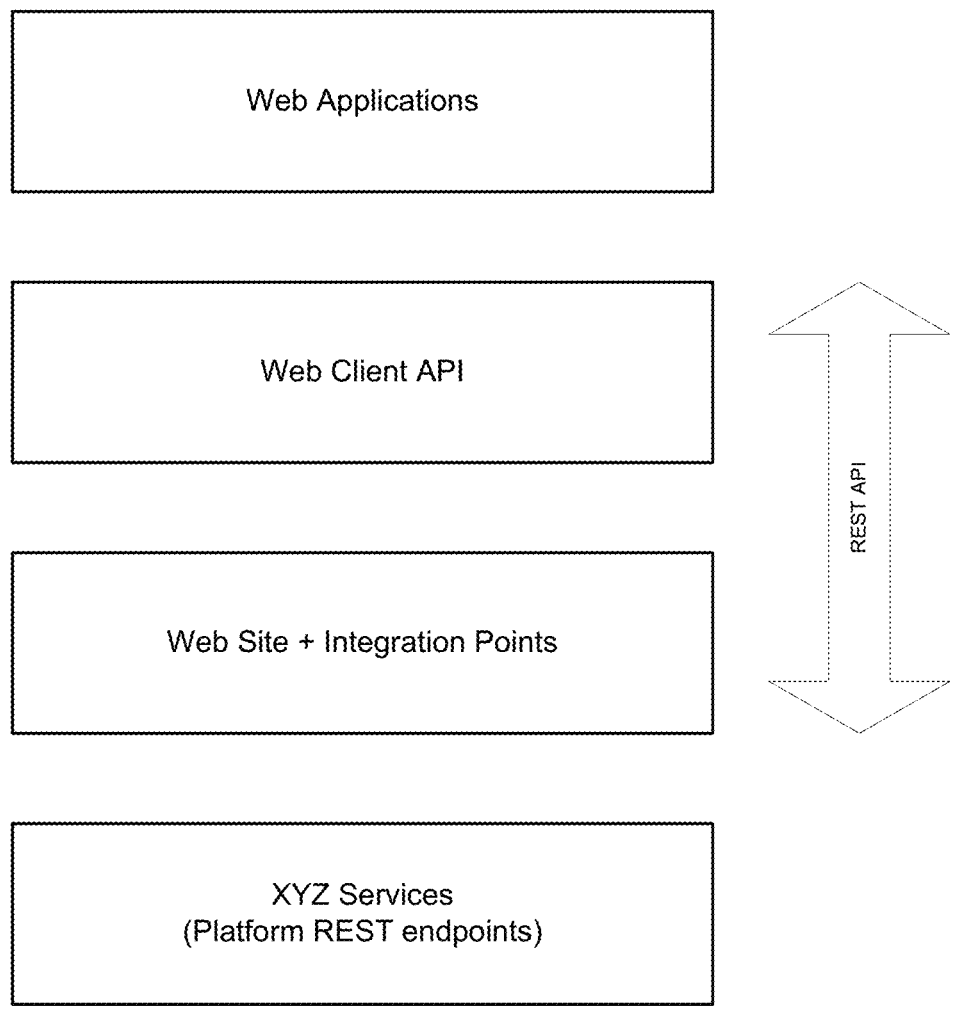
FIG. 4 illustrates functional elements supporting web services for a Representational State Transfer (REST) architecture, in accordance with a representative embodiment of the present invention.

FIG. 4 illustrates functional elements supporting web services for a Representational State Transfer (REST) architecture, in accordance with a representative embodiment of the present invention.

Figure 5:
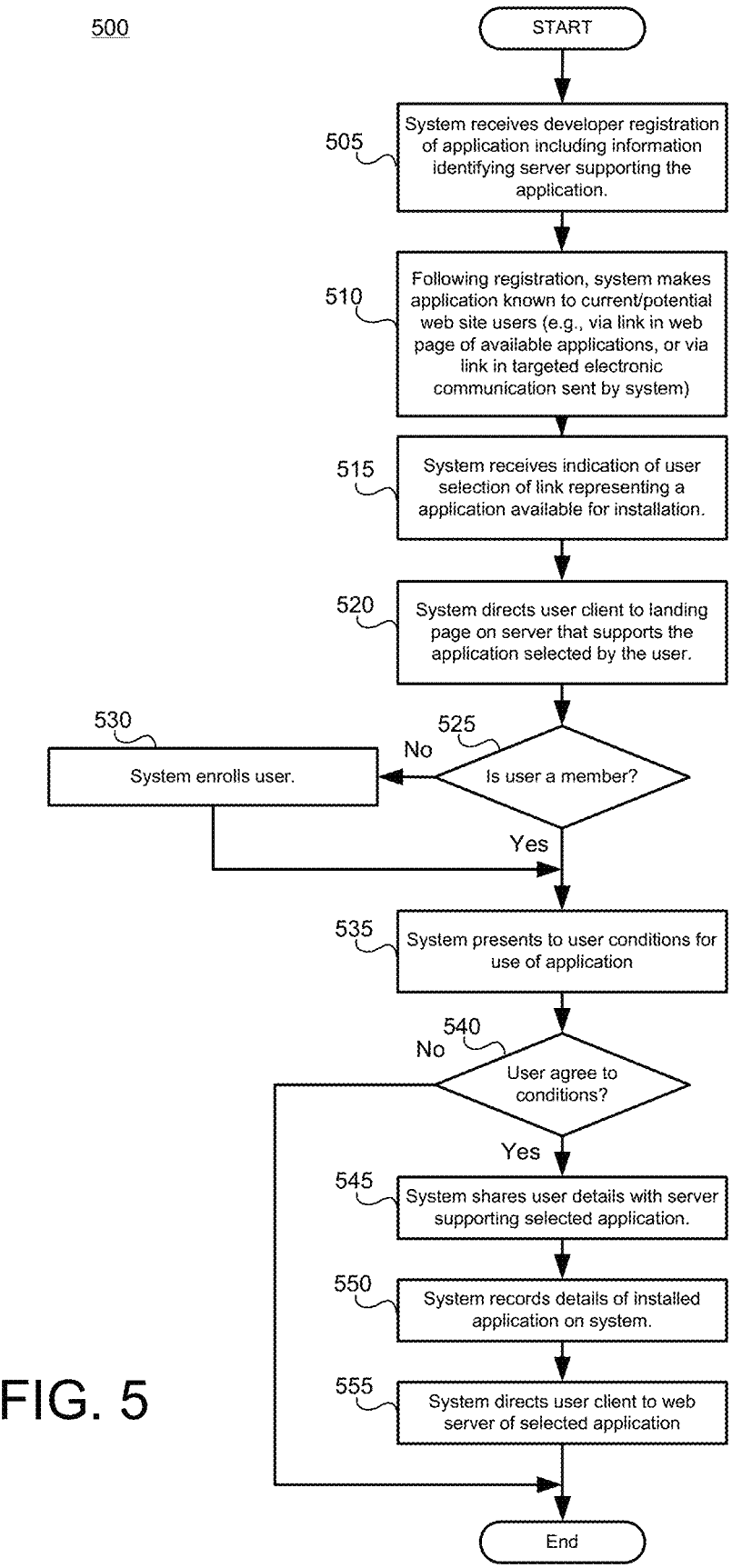
FIG. 5 is a flow chart illustrating an exemplary method of operating a system such as, for example, the e-commerce platform of FIG. 1, which supports registration of user-selectable applications, in accordance with a representative embodiment of the present invention.

FIG. 5 is a flow chart illustrating an exemplary method of operating a system such as, for example, the e-commerce platform 150 of FIG. 1, which supports registration of user-selectable applications, in accordance with a representative embodiment of the present invention. The following description makes reference to the elements of FIG. 1. The method of FIG. 5 begins at block 505, where a system such as, for example, the e-commerce platform 150 of FIG. 1 receives a registration for an application supporting user installation on top of a web site such as that supported by the e-commerce platform 150. In a representative embodiment of the present invention, the registration may be performed by, for example, the organization that developed the application, and registration may identify the server on which the application resides, among other parameters as described hereinabove.

After registration, at block 510, the system may make the registered application known to current/potential web site users via, for example, paper or electronic advertising, including targeted advertising (e.g., email, text messaging) sent electronically by the system. Next, at block 515, the system may receive from a user client an indication of user selection of a link representing an application available for user installation. The system may the, at block 520, direct the user client (e.g., a browser) to the landing page for the application, on the server that supports the application selected by the user.

Next, at block 525, a check may be made to determine whether the user is a member of a loyalty program of the operator or sponsor of the e-commerce platform 150. If the user has not yet joined the loyalty program, the method of FIG. 5 then moves to block 530, where the user may be offered the opportunity to enroll. However, if the user is already a member of the loyalty program, or if the user choose to immediately enroll (at block 530), the method may, at block 535, present various conditions that may be required in order to use the application. In some representative embodiments of the present invention, no conditions may be required. The method may then determine, at block 540, whether the user has agreed to any conditions required for use of the application. If conditions are required, and the user has not agreed, then installation of the application for the present user ends at that point.

If, however, at block 540, the user agrees to any conditions required for use of the application, the system may then, at block 545, share user details with the server supporting the selected application. Next, at block 550, the system (e.g., the e-commerce system 150 of FIG. 1) records details of the installed application and the user, among other items, for later access on the system. Finally, in the exemplary method of FIG. 5, at block 555, the system directs the user client to the web server of the selected application, for any further interaction related to the use of the selected application.

Figure 6:
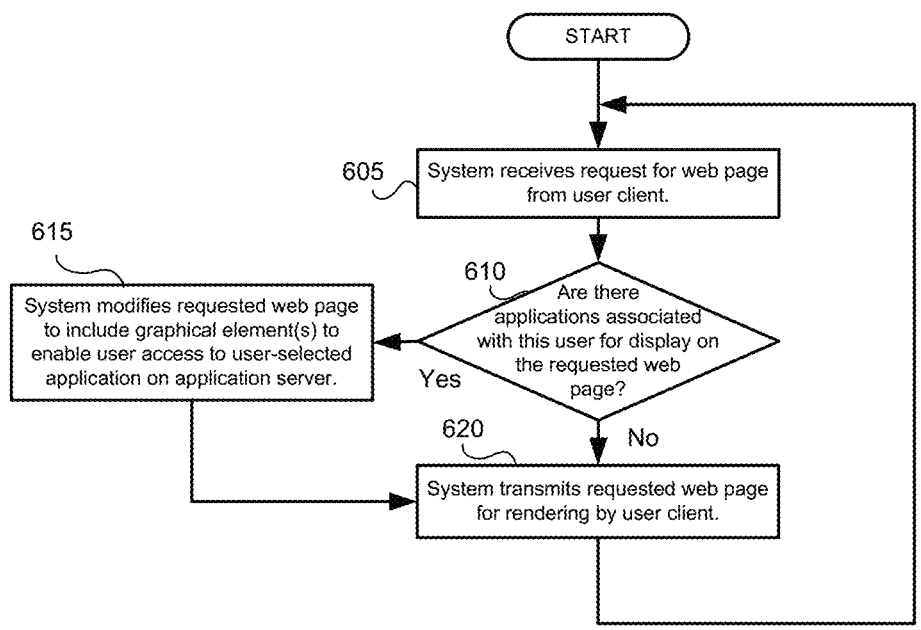
FIG. 6 is a flow chart illustrating an exemplary method of operating a system such as, for example, the e-commerce platform of FIG. 1, that supports the delivery of web pages having one or more user interface element(s) that enable access to user-selected applications, in accordance with a representative embodiment of the present invention.

FIG. 6 is a flow chart illustrating an exemplary method of operating a system such as, for example, the e-commerce platform 150 of FIG. 1, that supports the delivery of web pages having one or more user interface element(s) that enable access to user-selected applications, in accordance with a representative embodiment of the present invention. The following description makes reference to the elements of FIG. 1. The method of FIG. 6 begins at block 605, where a system such as, for example, the e-commerce system 150 of FIG. 1, receives a request to serve a web page to a user client (e.g., a web browser). As shown in FIG. 6, the method, at block 610, then checks records for the current user (e.g., a user profile of the logged-in user) to determine whether the current user has any applications installed that are to appear on the web page being served. If no applications are to be made visible on the web page being served to the current user, the method then, at block 620, transmits the requested web page to the current user for rendering by the user client, and loops back to block 605.

If however, at block 610, the method determines that the current user does have applications installed on the system that are to appear on the web page presently being served, the information representing the web page (e.g., the HTML) is modified to include additional user interface elements, and in some instances, executable code such as, for example, JavaScript, to enable user access to the corresponding application on the application server that supports the installed applications. The system performing the method of FIG. 6 then, at block 620, transmits the modified web page to the user client to be rendered for display to the user. The method then continues at block 605.

Figure 7:
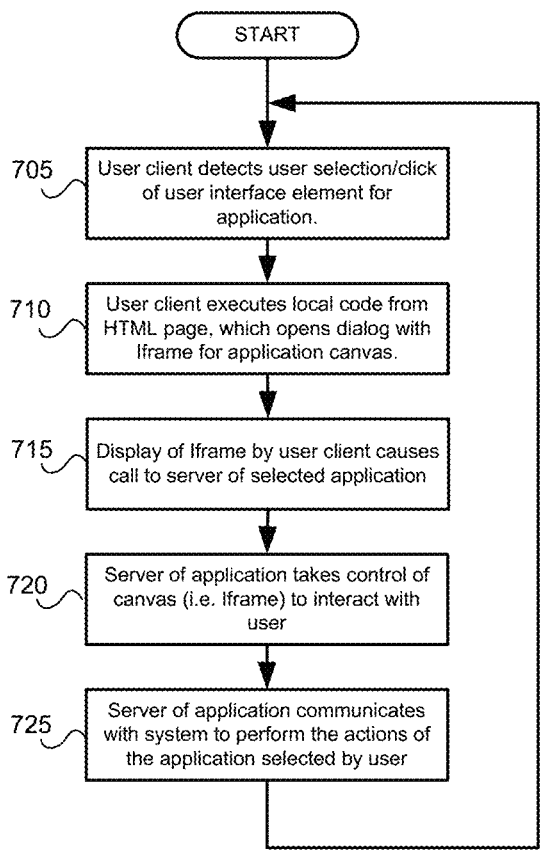
FIG. 7 is a flow chart illustrating an exemplary method of operating a system such as, for example, the e-commerce platform of FIG. 1, that supports the display of web pages having one or more user interface element(s) that enable access to user-selected applications, in accordance with a representative embodiment of the present invention.

FIG. 7 is a flow chart illustrating an exemplary method of operating a system such as, for example, the e-commerce platform 150 of FIG. 1, that supports the display of web pages having one or more user interface element(s) that enable access to user-selected applications, in accordance with a representative embodiment of the present invention. The following description makes reference to the elements of FIG. 1. The method of FIG. 7 begins at block 705, where a user client (e.g. a browser) detects user selection of a user interface element on a web page served by a system such as, for example, the e-commerce platform 150 of FIG. 1, in which the user interface element represents an application installed on top of the capabilities of the web site supported by the system. In response to the detection of the selection of an installed application by the user, the method may then, at block 710, execute local code that may be received as part of the modified web page on which the user interface element for the application appears, as described above with respect to FIG. 6. In a representative embodiment of the present invention, the executable code may cause a dialog box containing an HTML IFrame for the display of a "canvas" (e.g., the "canvas" portion 220 of FIG. 2A) for the selected application to open at the user client. Next, at block 715, the display of the IFrame by the user client causes a call to the server that supports the selected application (e.g., the application/web server 170 of FIG. 1 identified by the "base URL" 256 of FIG. 2B). The server supporting the application, in response to the call from the IFrame rendered by the user client, takes control of the "canvas" displayed in the IFrame, at block 720, to enable interaction of the installed application with the user. The selected application running on the server (e.g., the application/web server 170 of FIG. 1) may then, at block 725, communicate with the system on which the user installed the application, to enable the user to perform the actions of the selected application upon the system (e.g., the e-commerce platform 150 of FIG. 1). The method of FIG. 7 may then loop back to block 705 to continue processing additional user input to the web page rendered by the system, or to process user selection of user installed applications shown on the web page presently displayed by the user client, in accordance with a representative embodiment of the present invention.

A representative embodiment of the present invention may provide a number of "integration points" for use by third-party applications including, but not limited to, "platform integration hooks," "application canvases" or "app canvases," and a "platform API." A representative embodiment of the present invention may include "app" (i.e., "application") canvases that provide, for example, presence in a "navigation menu," an "application ("app") page," a "landing page," in user "login flow", in a user "newsfeed," in "product pages," in product "quick views," on "tag pages," and through the use of "name indicators." Further details of the use of these canvases are provided below.

Figure 8:
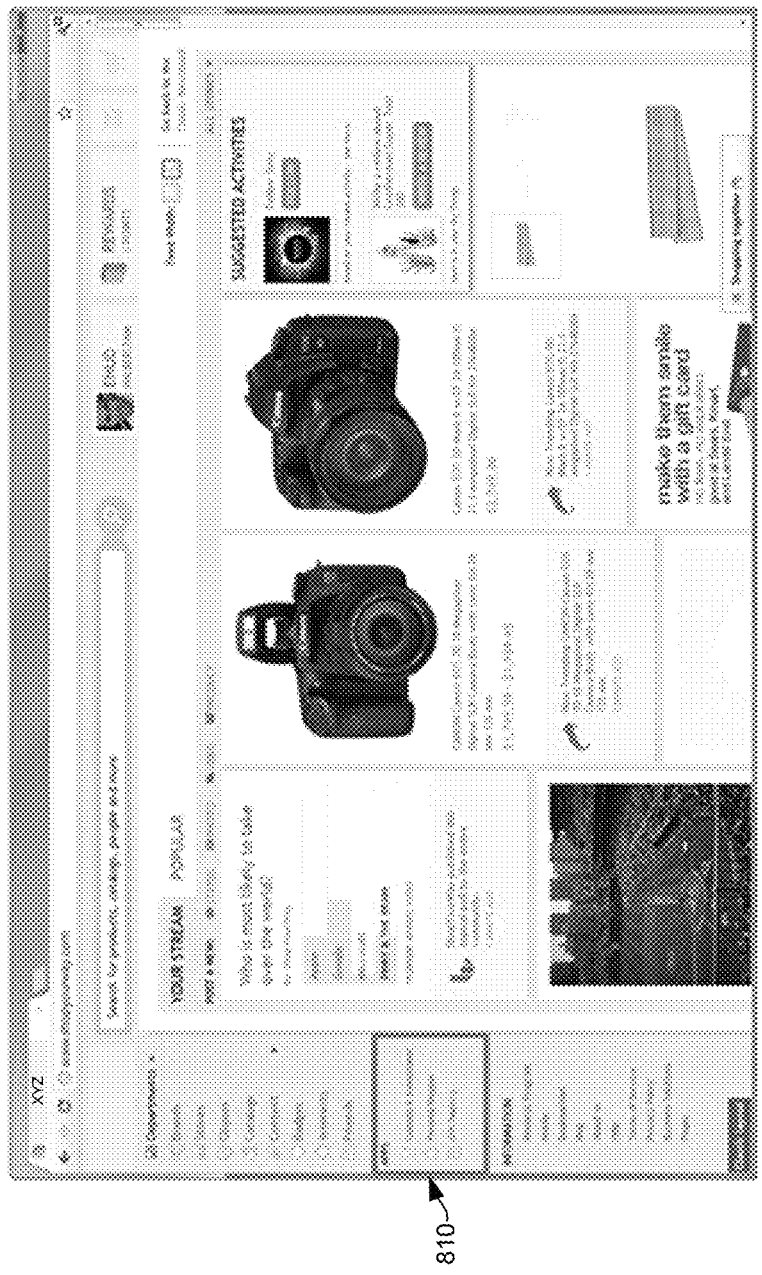
FIG. 8 is an illustration of a screen image showing an exemplary navigation menu portion that may correspond to, for example, the "left nav" portion described with respect to the operation of the elements of the system of FIG. 1, in accordance with a representative embodiment of the present invention.

FIG. 8 is an illustration of a screen image showing an exemplary navigation menu portion 810 that may correspond to, for example, the "left nav" portion 210 described above with respect to FIG. 2A and the operation of the elements of the system of FIG. 1, in accordance with a representative embodiment of the present invention. Once a user approves the installation of an application, an application link may appear in the "left nav" menu under the navigation menu portion 810. In some representative embodiments of the present invention, the application link may remain visible until the user "un-registers" or "un-installs" the application.

Figure 9:
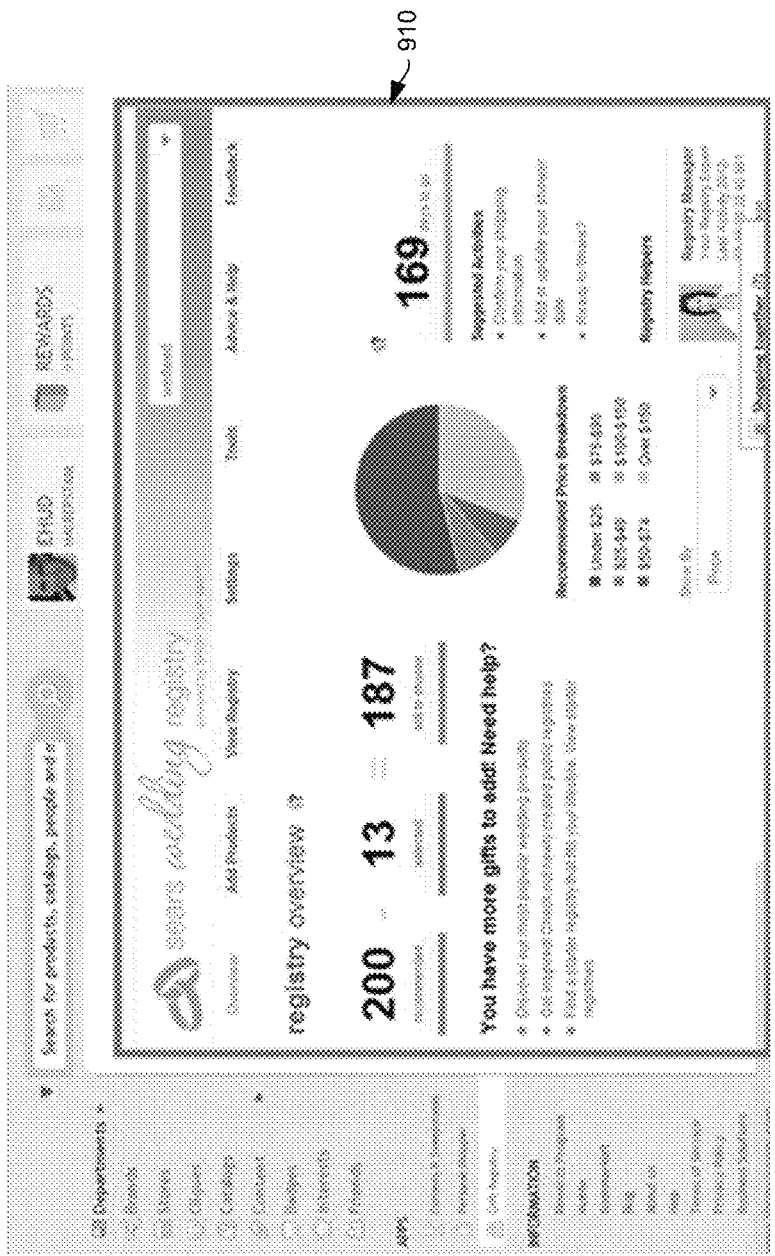
FIG. 9 is an illustration of a screen image showing an exemplary main application page, in accordance with a representative embodiment of the present invention.

FIG. 9 is an illustration of a screen image 900 showing an exemplary main application page 910 that may correspond to, for example, the "canvas" portion 220 of FIG. 2A, in accordance with a representative embodiment of the present invention. In a representative embodiment of the present invention, users may be directed to a web page such as the main application page 910 upon selecting/clicking a corresponding application link on a portion of the screen image 900 such as, for example, the "left nav" portion 210 as described above with respect to FIG. 1, FIG. 2A, and FIG. 8, for example.

Figure 10:
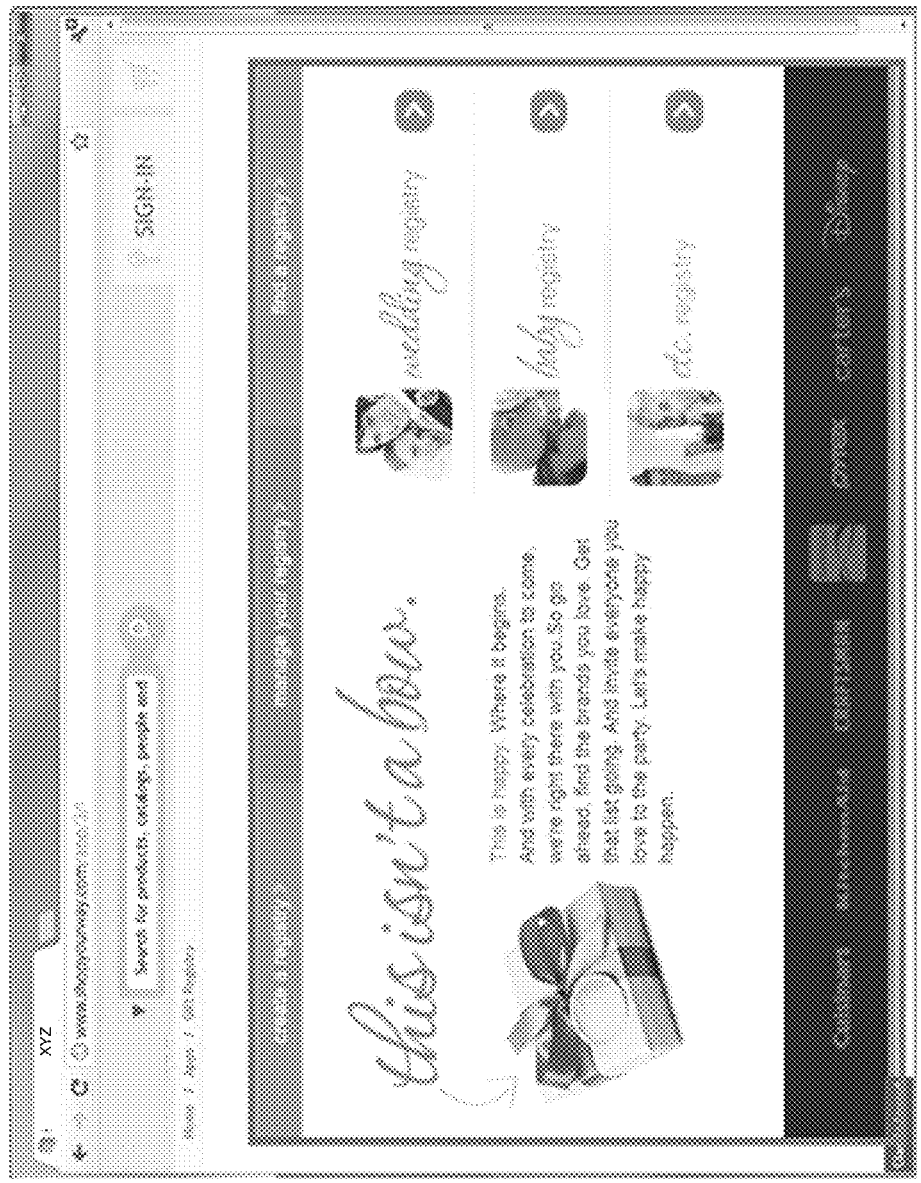
FIG. 10 is an illustration of a screen image showing an exemplary landing page, in accordance with a representative embodiment of the present invention.

FIG. 10 is an illustration of a screen image showing an exemplary landing page 1000, in accordance with a representative embodiment of the present invention. A web site page such as the landing page 1000 of FIG. 10 for an application may serve as a gateway to an application, and may be the first web page served when accessing the base URL for the application. In a representative embodiment of the present invention, the base URL identifies the server from which the application serves its web pages. In various representative embodiments of the present invention, a landing page such as the landing page 1000 may be viewable by anyone, including web site visitors who haven't signed-in to the system serving this web page such as, for example, the e-commerce platform 150 of FIG. 1.

Figure 11:
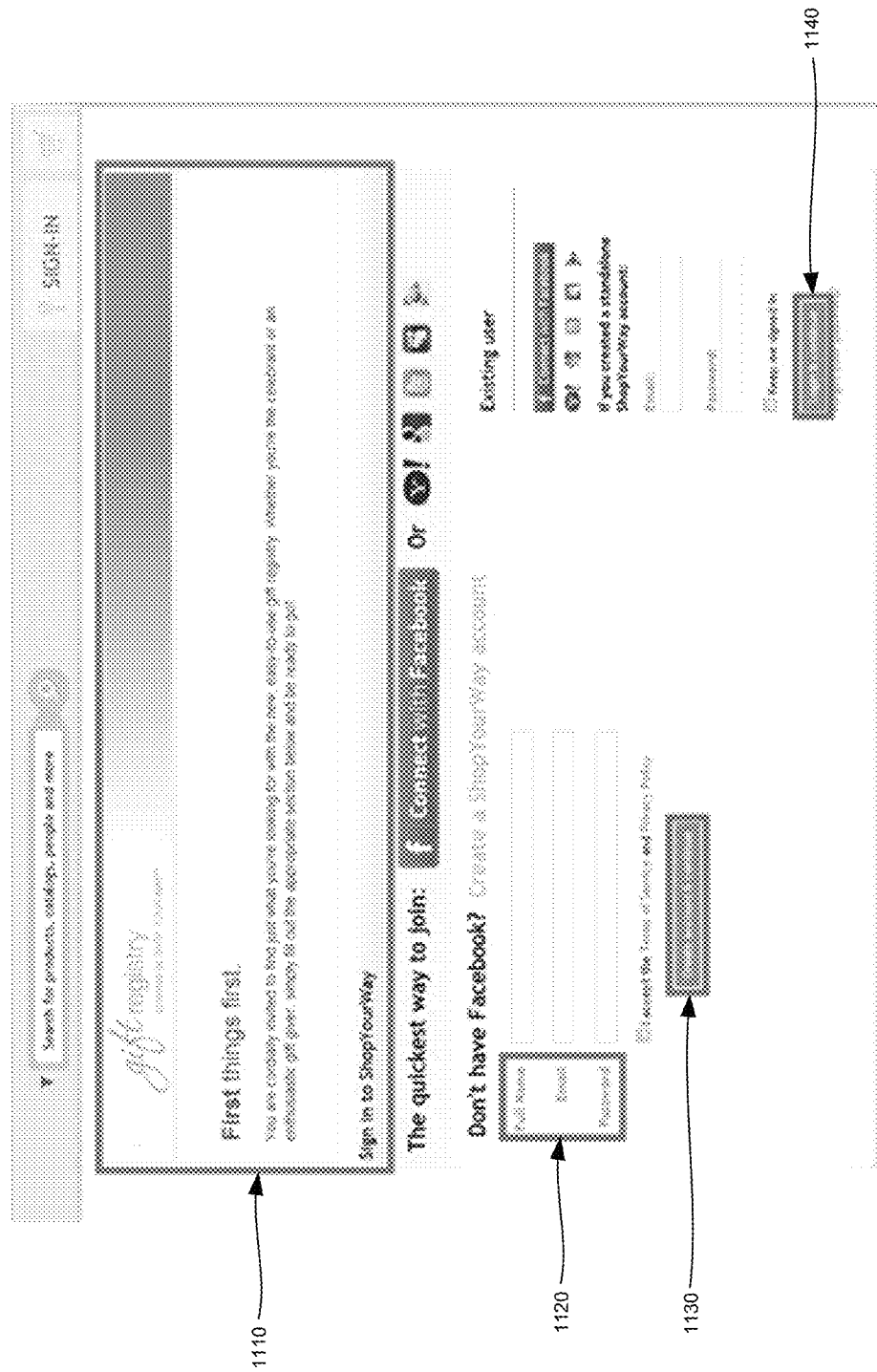
FIG. 11 is an illustration of a screen image showing an exemplary application sign-in page, in accordance with a representative embodiment of the present invention.

FIG. 11 is an illustration of a screen image showing an exemplary application sign-in page 1100, in accordance with a representative embodiment of the present invention. In a representative embodiment of the present invention, the sign-in flow may support customizing a header portion 1110, labels 1120, and buttons 1130, 1140 to help maintain the look and feel of the application during a user sign-in phase.

Figure 12:
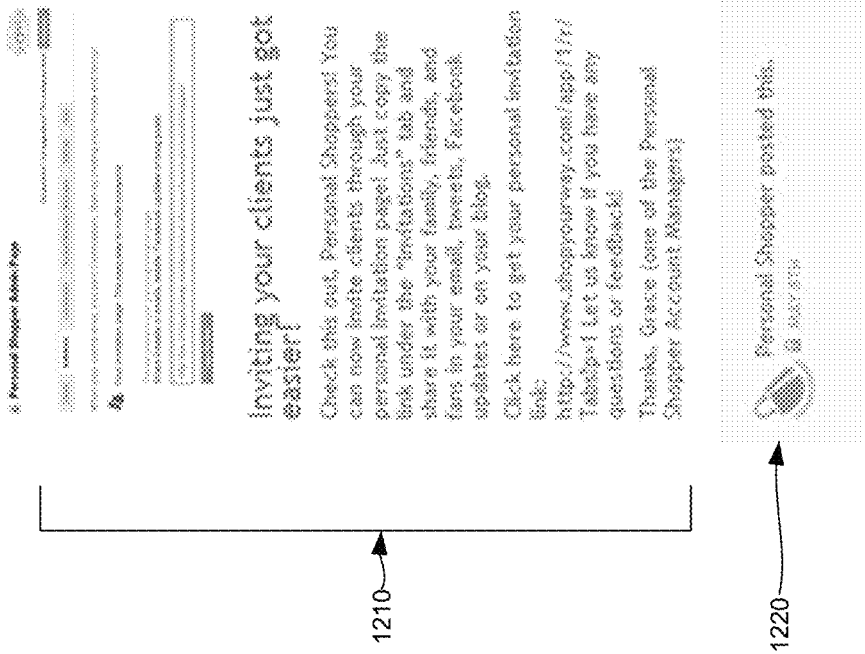
FIG. 12 is an illustration of an exemplary story as might be published to the newsfeed of a user on a system such as, for example, the e-commerce platform by an application running on a system such as, for example, the application/web server of FIG. 1, in accordance with a representative embodiment of the present invention.

FIG. 12 is an illustration of an exemplary story 1200 as might be published to the newsfeed of a user on a system such as, for example, the e-commerce platform 150 by an application running on a system such as, for example, the application/web server 170 of FIG. 1, in accordance with a representative embodiment of the present invention. In a representative embodiment of the present invention, an application may publish stories to "user" and "tag" newsfeeds. This feature enables applications to reach out to users of the application by publishing updates. A story published by a representative embodiment of the present invention may include a body portion 1210 and an application link 1220 (i.e., "Personal Shopper") at the bottom of the story 1200. In some representative embodiments of the present invention, any user who views a story, even those who are not registered with the application that published the story, may visit the application page by clicking the application link 1220. This innovative feature of a representative embodiment of the present invention makes newsfeed stories a key marketing tool for an application.

Figure 13:
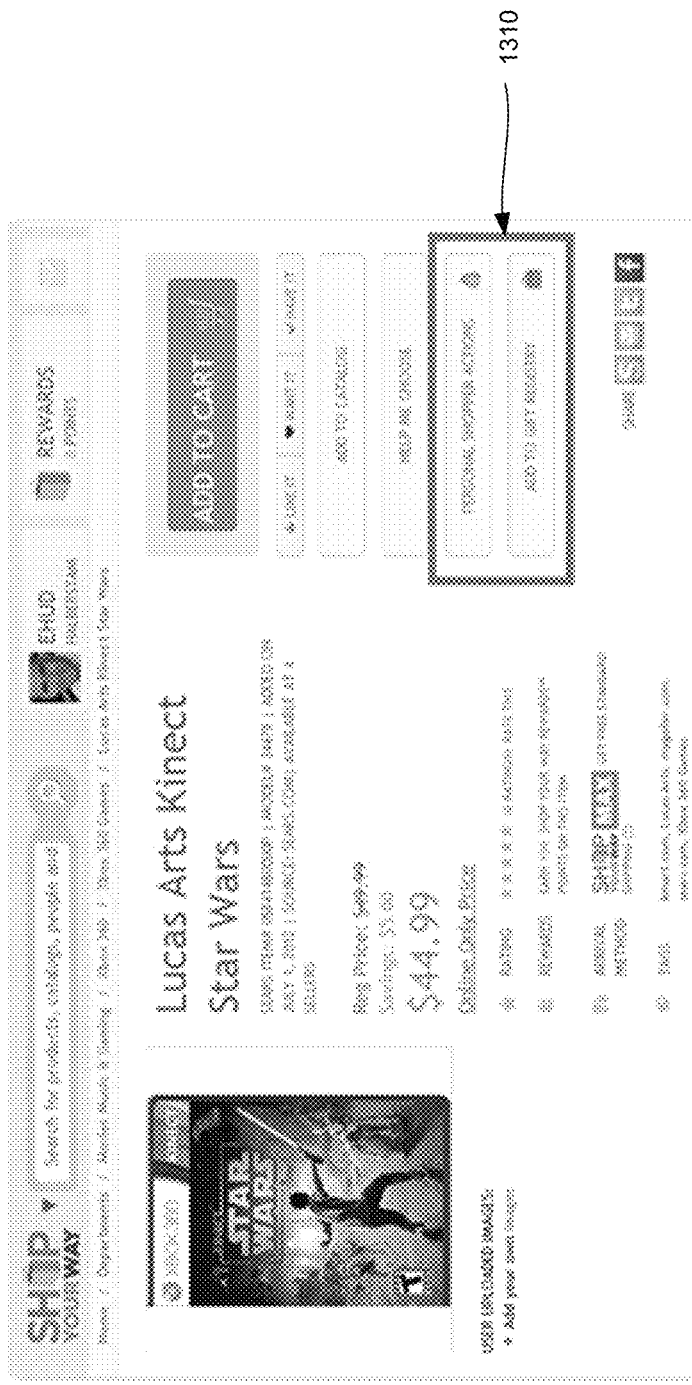
FIG. 13 in an illustration of a screen image showing an exemplary product page, in accordance with a representative embodiment of the present invention.

FIG. 13 in an illustration of a screen image showing an exemplary product page 1300 having "action buttons" 1310, in accordance with a representative embodiment of the present invention. One or more applications may have "action buttons" displayed on a product page, such as the two application buttons 1310 shown in FIG. 13. As also described above with respect to FIG. 1, when a user selects/clicks an application button such as, for example, the application links or buttons 1310, an application "canvas" may appear inside a dialog. In a representative embodiment of the present invention, user selection of an "action button" such as the application buttons 1310 may cause information that identifies the product (i.e., a "product ID") of the product page to be passed to the application "canvas", which permits the application to display product-specific content and to take relevant actions within the "canvas".

Figure 14:
FIG. 14 is an illustration of a screen image of an exemplary tag page, in accordance with a representative embodiment of the present invention.

FIG. 14 is an illustration of a screen image of an exemplary tag page 1400, in accordance with a representative embodiment of the present invention. In some representative embodiments of the present invention, an application may surface a "custom tab" 1410 in what may be referred to herein as "brand" pages. This feature is a great way to surface brand-specific information in the immediate context of the brand. In some representative embodiments of the present invention, such application "tabs" may only appear to a user of the application.

Figure 15:
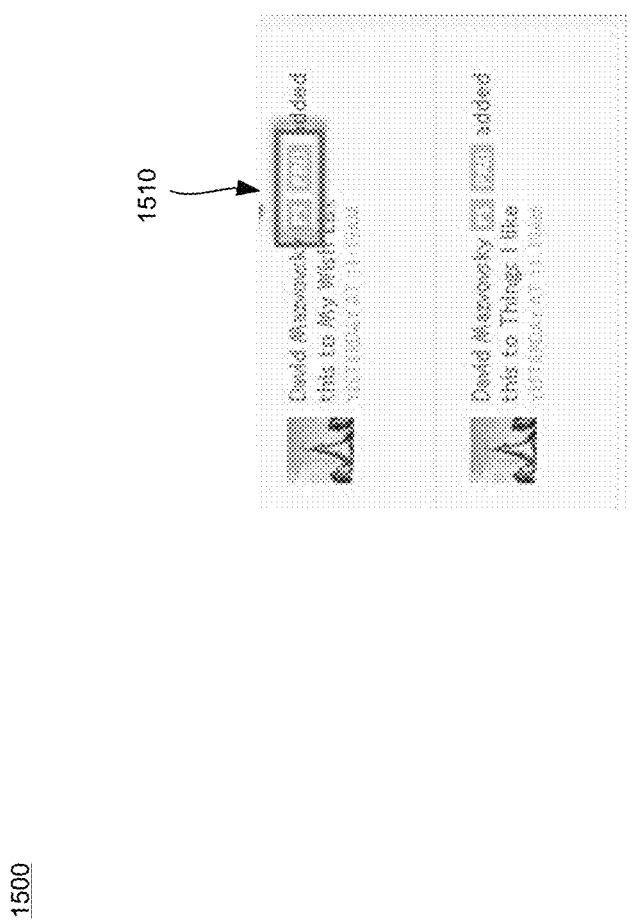
FIG. 15 is an illustration of an exemplary indicator that an application may surface next to a user's name across a web site such as that supported by the e-commerce platform of FIG. 1, in accordance with a representative embodiment of the present invention.

FIG. 15 is an illustration of an exemplary indicator 1510 that an application may surface next to a user's name across a portion 1500 of a web site page such as that supported by the e-commerce platform 150 of FIG. 1, in accordance with a representative embodiment of the present invention. The indicator 1510 may be used to "tag" a user, to denote him/her as an experienced user of application(s) (i.e., a 'pro' user), or as a distinguished achiever. A representative embodiment of the present invention may enable a user to hover a pointing device (e.g., a mouse pointer) over/above the indicator 1510, to cause the surfacing of a dialog (not shown) that is within the control of the application associated with the indicator 1510. The dialog may enable linking to a relevant application experience. In some representative embodiments of the present invention, the indicator 1510 may be visible to all users, and hence may serve as a useful marketing tool.

A representative embodiment of the present invention may provide a number of "integration points" for use with/by applications of third party developers. As was described above, the integration points available to an application include a number of "application canvases." Application canvases available in a representation embodiment of the present invention may include, but are not limited to application canvases for a "landing page" for the application, for a "login page" supporting login for existing members of a loyalty program of the operator/sponsor of the system such as the e-commerce platform 150 of FIG. 1, for a "join page" to enable new users to become members of such a loyalty program, for a "post-login page," for various sizes of "application canvas pages," for an "application tab" in a "tag page," for an "application wall," and for a "product action." Each of these canvases may have a corresponding "page URL," "canvas URL," and "canvas width."

Aspects of the present invention may be found in a method of operating a system supporting addition of functionality of a user-selected application to web pages delivered by the system to a user. Such a method may comprise receiving, from a second system, information that identifies an application selectable by the user and a network address of the second system that performs functionality of the application, and receiving, from the user, input indicating selection of the application for activation by the user via one or more web pages delivered to the user by the system. A representative embodiment of the present invention may also comprise associating information that identifies the user with information that identifies the user-selected application, and delivering, to the user, the one or more web pages formatted according to a comparison of metadata of the one or more web pages and one or more parameter values associated with the user-selected application. Such a method may further comprise activating the functionality of the user-selected application at the second system in response to receipt of input of the user upon a graphical user interface element representative of the user-selected application and displayed on the one or more web pages.

In various representative embodiments of the present invention, delivering may comprise formatting the one or more web pages to cause display of the graphical user interface element representative of the user-selected application and responsive to user input, if the one or more parameter values match the metadata of the one or more web pages. Delivering may also comprise formatting the one or more web pages to not cause display of the graphical user interface element representative of the user-selected application, if the one or more parameter values do not match the metadata of the one or more web pages. Formatting the one or more web pages to cause display of the graphical user interface element may add information representative of the graphical user interface element to the one or more web pages.

In a representative embodiment of the present invention, the functionality of the user-selected application at the second system may control content displayed to the user via a second graphical user interface element of the one or more web pages. The graphical user interface element may be displayed according to information provided to the system by the second system, the formatting may adds executable instructions to the one or more web pages, the functionality of the user-selected application at the second system may send a message to one or more members of a social network of the user.

Yet other aspects of the present invention may be seen in a system supporting addition of functionality of a user-selected application to web pages delivered by the system to a user. Such a system may comprise at least one processor for communicatively coupling to a user device, where the at least one processor is operable to, at least, perform the actions of the method described above.

Additional aspects of the present invention may be observed in a non-transitory computer-readable medium having a plurality of code sections, where each code section comprises a plurality of instructions executable by a processor to cause the processor to perform actions of a method of operating a system supporting addition of functionality of a user-selected application to web pages delivered by the system to a user, as described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Such an embodiment of the present invention may be stored, for example, in a non-transitory computer-readable medium accessed by one or more processors of a system (e.g., of the various devices of FIG. 1) in which the one or more processors perform the instructions to cause the system to perform the actions of the methods described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a first system supporting addition of functionality of a user-selected application to web pages delivered by the first system to a user, the method comprising:
   receiving, from a second system operated by a third party that is different from an operator of the first system, information that identifies an application selectable by the user, a third-party graphical element, and a network address of the second system that performs functionality of the application;
   receiving, from the user, input indicating selection of the application for activation by the user via one or more web pages delivered to the user by the first system;
   registering the application and the third-party graphical element with the first system;
   providing an application identifier that uniquely identifies and authenticates the application with the first system;
   adding executable instructions to hypertext markup language instructions of the one or more web pages provided by the first system to format the third-party graphical element;
   associating information that identifies the user with information that identifies the user-selected application;
   delivering, to the user, the one or more web pages formatted according to a comparison of metadata of the one or more web pages and one or more parameter values associated with the user-selected application; and
   activating the functionality of the user-selected application at the second system in response to receipt of input of the user via a graphical user interface element representative of the user-selected application and displayed on the one or more web pages.

2. The method according to claim 1, wherein delivering comprises:
   formatting the one or more web pages to cause display of the graphical user interface element representative of the user-selected application and responsive to user input, if the one or more parameter values match the metadata of the one or more web pages; and
   formatting the one or more web pages to not cause display of the graphical user interface element representative of the user-selected application, if the one or more parameter values do not match the metadata of the one or more web pages.

3. The method according to claim 1, wherein formatting the one or more web pages to cause display of the graphical user interface element adds information representative of the graphical user interface element to the one or more web pages.

4. The method according to claim 1, wherein the functionality of the user-selected application at the second system controls content displayed to the user via a second graphical user interface element of the one or more web pages.

5. The method according to claim 1, wherein the graphical user interface element is displayed according to information provided to the first system by the second system.

6. The method according to claim 1, wherein the formatting adds executable instructions to the one or more web pages.

7. The method according to claim 1, wherein the functionality of the user-selected application at the second system sends a message to one or more members of a social network of the user.

8. A first system supporting addition of functionality of a user-selected application to web pages delivered by the first system to a user, the first system comprising:
at least one processor that is communicatively coupled to a user device, the at least one processor operable to, at least:
receive, from a second system operated by a third party that is different from an operator of the first system, information that identifies an application selectable by the user, a third-party graphical element, and a network address of the second system that performs functionality of the application;
receive, from the user, input indicating selection of the application for activation by the user via one or more web pages delivered to the user by the first system;
register the application and the third-party graphical element with the first system;
provide an application identifier that uniquely identifies and authenticates the application with the first system;
add executable instructions to hypertext markup language instructions of the one or more web pages provided by the first system to format the third-party graphical element;
associate information that identifies the user with information that identifies the user-selected application;
deliver, to the user, the one or more web pages formatted according to a comparison of metadata of the one or more web pages and one or more parameter values associated with the user-selected application; and
activate the functionality of the user-selected application at the second system in response to receipt of input of the user via a graphical user interface element representative of the user-selected application and displayed on the one or more web pages.

9. The system according to claim 8, wherein delivering comprises:
formatting the one or more web pages to cause display of the graphical user interface element representative of the user-selected application and responsive to user input, if the one or more parameter values match the metadata of the one or more web pages; and
formatting the one or more web pages to not cause display of the graphical user interface element representative of the user-selected application, if the one or more parameter values do not match the metadata of the one or more web pages.

10. The system according to claim 8, wherein formatting the one or more web pages to cause display of the graphical user interface element adds information representative of the graphical user interface element to the one or more web pages.

11. The system according to claim 8, wherein the functionality of the user-selected application at the second system controls content displayed to the user via a second graphical user interface element of the one or more web pages.

12. The system according to claim 8, wherein the graphical user interface element is displayed according to information provided to the first system by the second system.

13. The system according to claim 8, wherein the formatting adds executable instructions to the one or more web pages.

14. The system according to claim 8, wherein the functionality of the user-selected application at the second system sends a message to one or more members of a social network of the user.

15. A non-transitory computer-readable medium having a plurality of code sections, each code section comprising a plurality of instructions executable by a processor to cause the processor to perform actions of a method of operating a first system supporting addition of functionality of a user-selected application to web pages delivered by the first system to a user, the actions comprising:
receiving, from a second system operated by a third party that is different from an operator of the first system, information that identifies an application selectable by the user, a third-party graphical element, and a network address of the second system that performs functionality of the application;
receiving, from the user, input indicating selection of the application for activation by the user via one or more web pages delivered to the user by the first system;
registering the application and the third-party graphical element with the first system;
providing an application identifier that uniquely identifies and authenticates the application with the first system;
adding executable instructions to hypertext markup language instructions of the one or more web pages provided by the first system to format the third-party graphical element;
associating information that identifies the user with information that identifies the user-selected application;
delivering, to the user, the one or more web pages formatted according to a comparison of metadata of the one or more web pages and one or more parameter values associated with the user-selected application; and
activating the functionality of the user-selected application at the second system in response to receipt of input of the user via a graphical user interface element representative of the user-selected application and displayed on the one or more web pages.

16. The non-transitory computer-readable medium according to claim 15, wherein delivering comprises:
formatting the one or more web pages to cause display of the graphical user interface element representative of the user-selected application and responsive to user input, if the one or more parameter values match the metadata of the one or more web pages; and
formatting the one or more web pages to not cause display of the graphical user interface element representative of the user-selected application, if the one or more parameter values do not match the metadata of the one or more web pages.

17. The non-transitory computer-readable medium according to claim 15, wherein formatting the one or more web pages to cause display of the graphical user interface element adds information representative of the graphical user interface element to the one or more web pages.

18. The non-transitory computer-readable medium according to claim 15, wherein the functionality of the user-selected application at the second system controls content displayed to the user via a second graphical user interface element of the one or more web pages.

19. The non-transitory computer-readable medium according to claim 15, wherein the graphical user interface element is displayed according to information provided to the first system by the second system.

20. The non-transitory computer-readable medium according to claim 15, wherein the formatting adds executable instructions to the one or more web pages.

21. The non-transitory computer-readable medium according to claim 15, wherein the functionality of the user-selected application at the second system sends a message to one or more members of a social network of the user.

* * * * *